V. G. APPLE.
SWITCH.
APPLICATION FILED APR. 14, 1915.
1,196,637.
Patented Aug. 29, 1916.
2 SHEETS—SHEET 1.
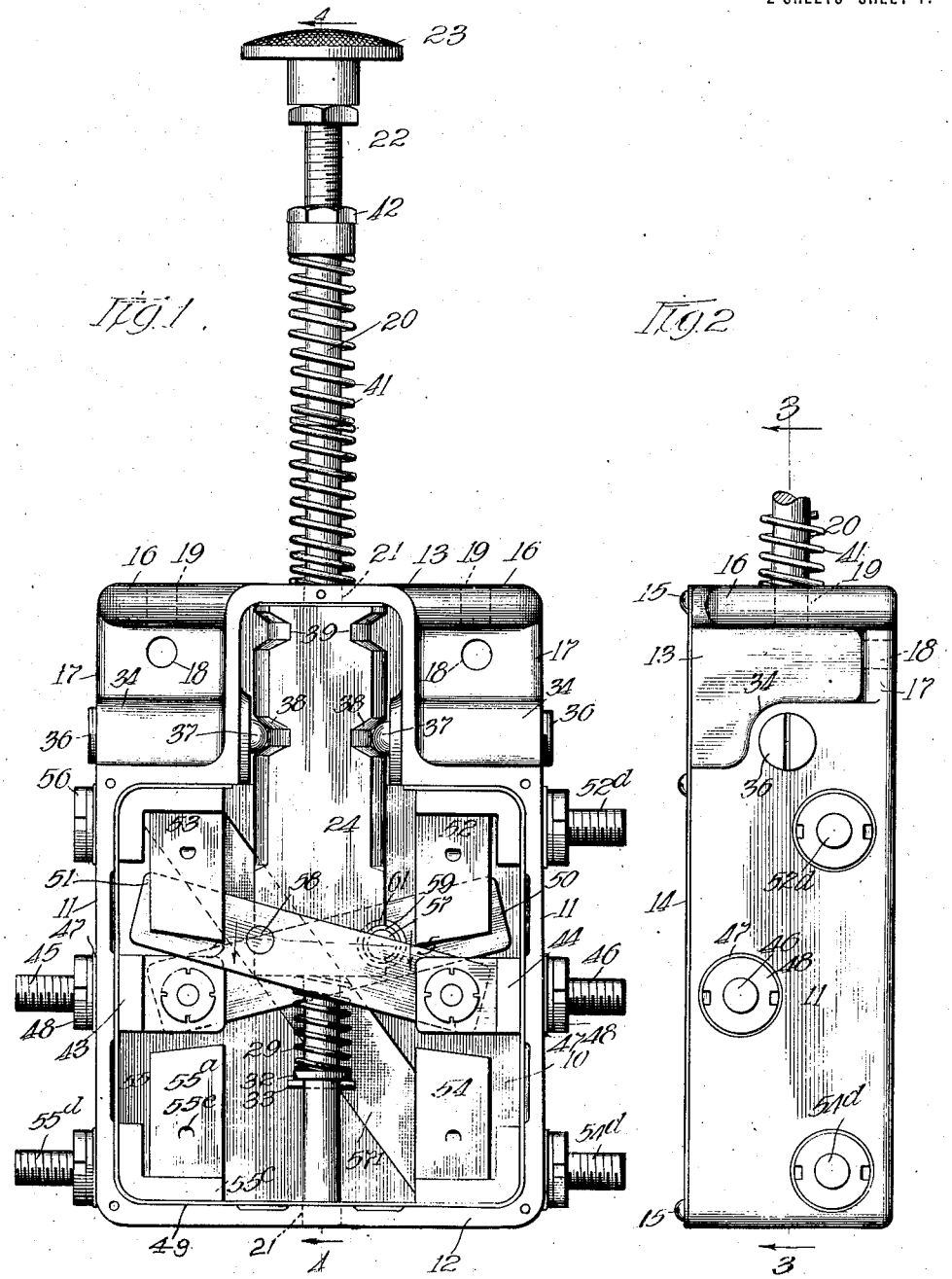

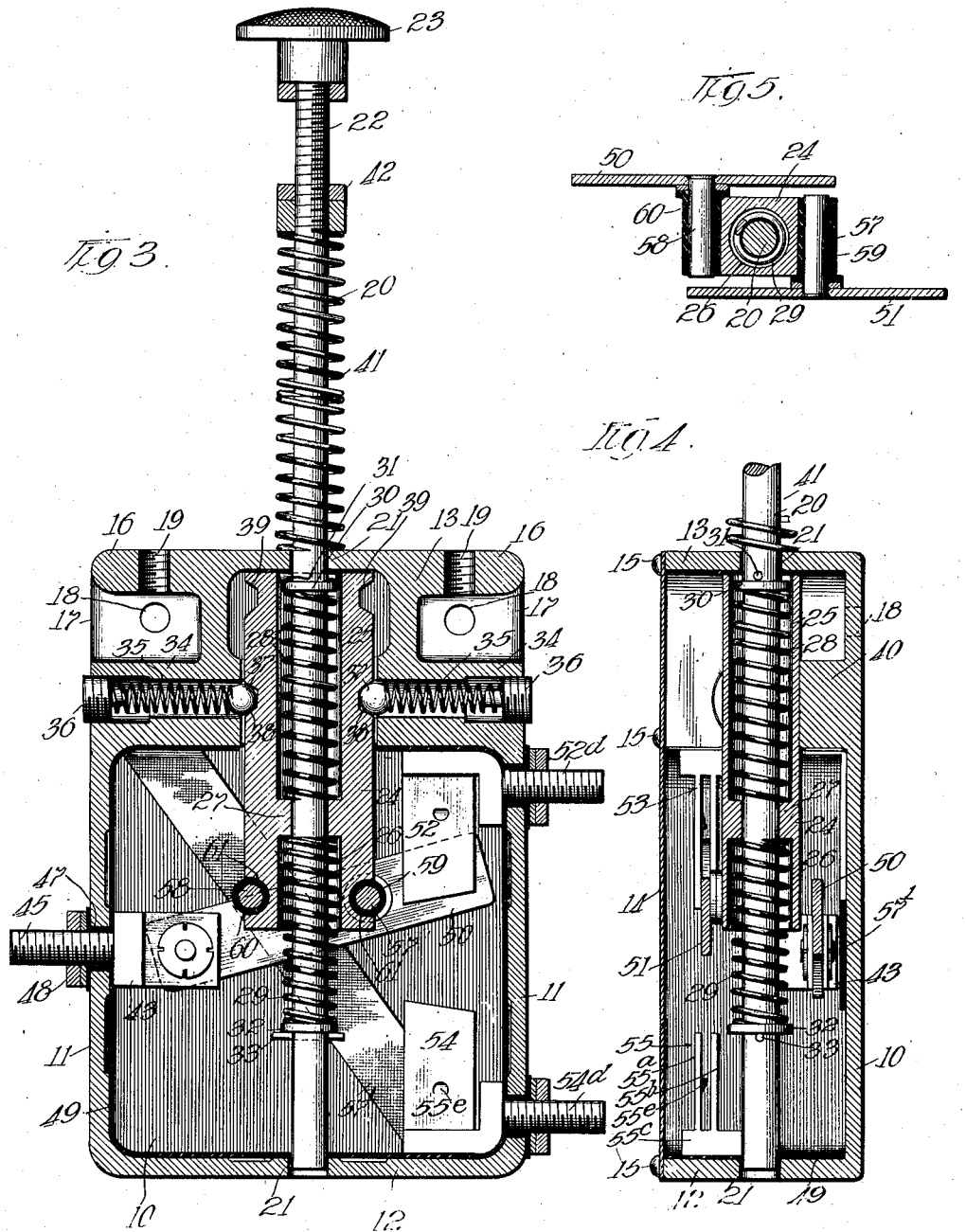

UNITED STATES PATENT OFFICE.

VINCENT G. APPLE, OF DAYTON, OHIO.

SWITCH.

1,196,637.   Specification of Letters Patent.   Patented Aug. 29, 1916.

Application filed April 14, 1915. Serial No. 21,220.

*To all whom it may concern:*

Be it known that I, VINCENT G. APPLE, a citizen of the United States, residing at Dayton, in the county of Montgomery and State of Ohio, have invented certain new and useful Improvements in Switches, of which the following is a specification.

This invention relates to improvements in switches and more particularly to a plunger operated switch in which a reciprocating part moves a pair of pivoted knife blades from one set of contacts into engagement with another set when moved from one extreme position to another.

One of the objects of my invention is to provide such a switch of rugged, weather-proof construction, adapted for use in connection with automobile electric self starting apparatus.

Another object of my invention is the provision of such a switch in which the switch parts instead of being carried by the reciprocating plunger are mounted entirely upon the switch casing and the blades operated through connections with the plunger.

Other and further objects of my invention will become apparent to those skilled in the art from a consideration of the following description and drawings, wherein:

Figure 1 is a front elevation of my improved switch with its casing cover removed. Fig. 2 is a side elevation. Fig. 3 is a vertical, sectional view on the line 3—3 of Fig. 2. Fig. 4 is a vertical, sectional view on the line 4—4 of Fig. 1, and Fig. 5 is a fragmentary, horizontal sectional view on the line 5—5 of Fig. 1.

In general the switch comprises an inclosing casing with a pair of switch blades each movable into two extreme positions for engagement with oppositely positioned contacts, movement of the blades being accomplished by a reciprocating plunger operable from without the casing.

In the drawings the numeral 10 indicates the base of a casing structure having parallel side walls 11—11, bottom wall 12 and a constricted upper portion within the walls 13. A cover piece 14 is secured over the face of the walls 11—11, 12 and 13 by means of the screws 15, completing the inclosure and providing a substantially water and dust tight casing.

A transverse wing 16 extends outwardly from each side of the upper constricted end of the casing at right angles to the base 10 and is joined by a web 17 to the body part of the casing, the web 17 being in alinement with and forming a part of the base 10. Bolt openings 18—18 are provided in the webs 17—17 and corresponding bolt openings 19—19 are provided in the wings 16—16, the former for attaching the casing to a support parallel with the base and the latter for attaching the casing to a support at right angles to the base, thus adapting the structure for ready attachment to any convenient part of a motor car.

The reciprocable operating plunger 20 passes through alined openings 21 and 21 in the upper and lower walls of the casing, carrying on its upper threaded end 22 a button or head 23. Within the casing and slidably mounted upon the reciprocable plunger 20 is a thimble 24 which in its normal upward position extends into the reduced portion of the casing confined within the wall 13. The upper and lower portions of the thimble are bored out, as at 25 and 26, leaving an intermediate stop or shoulder 27 against the upper side of which abuts the lower end of the coil spring 28 positioned within the bore 25 and against the lower side of which the upper end of the coil spring 29 extending into the bore 26 abuts. The upper end of the spring 28 bears against a washer 30 encircling the plunger 20 and secured against upward movement by means of a transverse pin 31. A similar washer 32 and pin 33 serve as a lower abutment for the spring 29. It is obvious that the thimble 24 is slidable upon the plunger, but is resiliently confined within certain limits of reciprocation by means of the springs 28 and 29.

Tubular extensions 34—34 integral with the casing extend outwardly from each side of the wall 13 and are bored out to receive the coil springs 35—35 and their adjustable abutments 36. The inner ends of the springs 35—35 act upon the restraining balls 37—37 and resiliently press them into engagement with the opposite sides of the thimble 24. A pair of opposite grooves 38—38 are provided in the thimble and are engaged by the balls 37—37 when the thimble is in its uppermost position. Spaced upwardly from these grooves 38—38 is a second pair of grooves 39—39 adapted to be engaged by the spring pressed balls when the thimble is thrown into its lowermost position. The front and back faces of the thimble 24 are faced off, the rear face making sliding contact with the guideway 40 integral with the base 10 of the casing. Normally the plunger 20, together with its resiliently positioned thimble 24 is held in its uppermost position by means of the coil spring 41 positioned on the rod above the casing, the lower end of the spring abutting against the casing wall and the upper end bearing against a nut 42 on the threaded portion 22 of the plunger.

Mounted at diametrically opposite points on the casing walls 11—11 but slightly offset in a horizontal plane are the two heads 43, 44 carried by the outwardly extending screw terminals 45, 46. The screw terminals are insulated from the casing by the bushings 47 and secured therein by means of the nuts 48. A strip of insulating material 49 passes around the interior surface of the walls, 11—11, and 12, insulating the heads 43 and 44 as well as the other heads, hereinafter referred to, from electrical contact with the casing. Pivoted on the heads 43, 44 are the switch blades 50, 51, the former passing at the rear of the thimble 24 and the latter at the front thereof. When in their uppermost position the switch blades 50, 51 engage respectively the contacts 52, 53, and when in their lowermost position engage respectively the contacts 54, 55.

The contacts 52, 53, 54 and 55 are all similarly constructed, and comprise a pair of blades 55$^a$ and 55$^b$, as illustrated in Fig. 4 mounted on a block 55$^c$ from which extends a binding post 55$^d$. A lug 55$^e$ is punched inwardly from the blade 55$^a$ to a position within the space between the two blades 55$^a$ and 55$^b$ so as to limit the inward movement of the switch blade 50. The other contacts are similarly constructed, the contact 52 having its outwardly extending binding post 52$^d$, the contact 54 having its binding post 54$^d$. The contact 53, however, has its binding post cut off outside of the nut 56 and is electrically connected by means of the insulated strip 57', lying along the base 10, with the contact 54.

Movement of the switch blades 50, 51 in response to movement of the reciprocable plunger 20 and its thimble 24 is secured by means of the inwardly extending pins 57, 58 secured to the blades and carrying insulating bushings 59, 60 which engage in oppositely positioned semi-circular grooves 61, near the lower end of the thimble 24.

The operation of the switch is simple, downward movement of the reciprocable plunger 20 first compresses the spring 28 until its energy is sufficient to overcome the side pressure of the spring pressed balls 37, 37, whereupon the energy of the spring 28 is utilized in throwing the thimble and its connected switch blades 50, 51 downwardly from engagement with the contacts 52, 53 and into engagement with the contacts 54, 55. The reverse operation of the plunger 20 under the action of the spring 41 first compresses the spring 29 until its energy is sufficient to force the thimble against the pressure of the spring pressed balls 37—37 out of the grooves 39—39, permitting the accumulated energy of the spring 29 to force the thimble upwardly together with the switch blade.

Whereas I have illustrated and described a single embodiment of my invention for the purpose of full and clear disclosure, it is obvious that certain variations might be made in the construction without departing from the spirit and scope of the following claims.

Having described my invention, what I claim is:

1. The combination in a switch of a casing with opposite side walls, a reciprocable member projecting into said casing between said walls, switch blades pivoted to said walls and extending past the member on opposite sides thereof, contacts for engagement by the free ends of the blades, said member having recesses formed in the opposite sides thereof, and means projecting from the blades for positive engagement with the recesses.

2. The combination in a switch of a casing with opposite side walls, a reciprocable member projecting into said casing between said walls, a switch blade pivoted at one end to one side wall, a second blade pivoted at one end to the opposite wall, said blades extending past the member on opposite sides thereof, opposite sets of contacts for engagement by the free ends of the blades at the opposite ends of their movement, said member having recesses formed in the opposite sides thereof, and means projecting from the blades for positive engagement with the recesses.

3. The combination in a switch, of a switch blade pivotally mounted at one end, oppositely positioned contacts adapted to be engaged by the free end of said blade when moved to one or the other of its extreme positions, a reciprocable plunger, a thimble slidable on said plunger and resiliently connected therewith, said thimble having a groove in one side thereof, and a pin projecting from said blade into engagement with the groove.

4. The combination in a switch, of a switch blade pivotally mounted at one end, oppositely positioned contacts adapted to be engaged by the free end of said switch blade when moved to one or the other of its extreme positions, a reciprocable plunger, a thimble slidable on said plunger and resiliently connected therewith, said thimble being movable in a plane parallel with the plane of switch movement, and having a groove formed in one side thereof, a pin projecting from said blade and an insulating bushing surrounding said pin and engaging with the groove in the thimble.

5. The combination in a switch, of an inclosing casing, a pair of switch blades pivotally connected to said casing at opposite sides thereof, a pair of oppositely positioned contacts for each blade adapted to be engaged by the free end thereof when moved to one or the other of their extreme positions, a reciprocable plunger passing through said casing, a thimble slidable thereon and resiliently connected therewith, said thimble passing between the blades and having grooves formed on opposite sides, and a pin projecting from each blade into engagement with one of the said grooves.

6. The combination in a switch of an inclosing casing having integral base, side, top and bottom walls, a detachable cover therefor, a pair of switch blades pivotally connected to opposite side walls of the casing, wiring terminals for said blades projecting outwardly from said side walls, a pair of oppositely positioned contacts for each blade carried by said side walls and adapted to be engaged by the free ends of the blades when moved to one or the other of their extreme positions, a reciprocable plunger passing through the top and bottom walls of the casing, a thimble slidable thereon and resiliently connected therewith, said thimble passing between the blades and having grooves formed on opposite sides, and a pin projecting from each blade into engagement with one of said grooves.

In testimony whereof I hereunto set my hand in the presence of two subscribing witnesses.

VINCENT G. APPLE.

In the presence of—
E. V. MARTIN,
H. E. BORGER.